United States Patent
Shepherd et al.

(10) Patent No.: US 7,088,533 B1
(45) Date of Patent: Aug. 8, 2006

(54) METHOD OF SELF-SERVO WRITING IN A DISK DRIVE USING A SPIRAL PATTERN

(75) Inventors: Stan Shepherd, Morgan Hill, CA (US); Nathan J. Hays, San Francisco, CA (US)

(73) Assignee: Maxtor Corporation, Longmont, CO (US)

( * ) Notice: Subject to any disclaimer, the term of this patent is extended or adjusted under 35 U.S.C. 154(b) by 266 days.

(21) Appl. No.: 10/128,959

(22) Filed: Apr. 23, 2002

(51) Int. Cl.
*G11B 5/09* (2006.01)
*G11B 21/02* (2006.01)
*G11B 5/596* (2006.01)

(52) U.S. Cl. ............................ 360/51; 360/48; 360/75; 360/77.07

(58) Field of Classification Search .................. 360/51, 360/77.01, 77.08
See application file for complete search history.

(56) References Cited

U.S. PATENT DOCUMENTS

| | | | |
|---|---|---|---|
| 5,668,679 A * | 9/1997 | Swearingen et al. ........... 360/75 |
| 6,005,739 A * | 12/1999 | Yun ......................... 360/77.04 |
| 6,091,564 A * | 7/2000 | Codilian et al. .............. 360/75 |
| 6,304,407 B1 * | 10/2001 | Baker et al. .................. 360/75 |
| 6,507,450 B1 * | 1/2003 | Elliott ..................... 360/77.08 |
| 6,678,102 B1 * | 1/2004 | Liikanen et al. .............. 360/31 |
| 6,738,205 B1 * | 5/2004 | Moran et al. ................. 360/17 |
| 2002/0030920 A1 * | 3/2002 | Min et al. ................ 360/77.04 |

* cited by examiner

*Primary Examiner*—Wayne Young
*Assistant Examiner*—Daniell L. Negrón
(74) *Attorney, Agent, or Firm*—Tejpal S. Hansra (57) ABSTRACT

A disk drive includes a head and a disk, spiral patterns are located on the disk, and the disk drive self-writes servo patterns on the disk using the spiral patterns as a reference for servoing the head. In an embodiment, the disk drive uses preliminary servo patterns to determine repeatable runout of the spiral patterns. In another embodiment, the disk drive reads each spiral pattern with multiple timing windows.

100 Claims, 8 Drawing Sheets

METHOD OF SELF-SERVO WRITING IN A DISK DRIVE USING A SPIRAL PATTERN

FIELD OF THE INVENTION

The present invention relates to disk drives, and more particularly to disk drive self-servo writing.

BACKGROUND OF THE INVENTION

In many processing and computing systems, magnetic data storage devices such as disk drives are used for storing data. A typical disk drive includes a spindle motor for rotating one or more data storage disks having data storage surfaces, a head arm that supports one or more transducer heads, and an actuator for moving the heads radially across the disks to enable the heads to read from and write to concentric tracks on the disks.

In general, the head is positioned very close to the corresponding disk surface. Typical clearance between the head and a smooth disk surface is about one microinch, or less. The close proximity of the head to the disk allows recording very high density servo patterns (embedded servo information) and user data on the disk.

The servo patterns are typically written into servo sectors with uniform circumferential (angular) spacing, and data sectors or blocks are interleaved between the servo sectors. The servo patterns are also arranged in radially extending servo spokes that are interspersed at regular intervals between user data areas on the disk. In addition, the servo patterns are radially close enough to allow servoing at an arbitrary radial position. At a given radius, the servo patterns include coarse identifiers and fine identifiers. The coarse identifiers provide radius and timing information when the head presents a read signal with sufficient amplitude to detect digital data. The fine identifiers are circumferentially sequential, radially staggered, single frequency bursts that provide radial position information when the head is offset from a track centerline enough to present a read signal with partial amplitude.

The servo patterns provide the disk drive with head position information to control the actuator to move the head from starting tracks to destination tracks during random access track seeking operations. Further, the servo patterns provide the disk drive with head position information to control the actuator to position and maintain the head in proper alignment with a track during track following operations when user data is read from or written to data sectors in concentric tracks on the disk surface.

In a standard manufacturing process, a head-disk assembly (HDA) of the disk drive is assembled in a clean room and then transported to a specialized servo writer where the HDA is mounted on a stabilized metrological measurement system. Then, in a time consuming process, the servo writer uses the head to write the servo patterns to the disk. The drive electronics are then assembled to the HDA and the disk drive is moved to a self-scan station where the disk drive is tested for reliable servo operation. Block errors, defects, control tracks and other information are written to the disks at this station. If the disk drive fails the self-scan tests, it is either reworked or scrapped at this late manufacturing stage.

Servo writers write the servo patterns with various processes. For example, a skip-track process writes the servo patterns at every other radius and then writes intermediate servo bursts at every skipped radius. As another example, a sync-skip process writes reference servo patterns at every other radius and then writes final servo patterns at every radius. The sync-skip process avoids the time-consuming step of measuring and compensating for head reader-to-writer offsets.

Disk drives have been developed that self-servo write the servo patterns without a servo writer. For example, an incremental two-pass self-servo write process begins with a first pass that writes reference servo patterns at a position determined by a crash-stop (the mechanical limit of the head's movement) and then servos on the reference servo patterns and writes the next set of reference servo patterns. The first pass repeats as the head moves radially across the disk, with each step servoing on the previously written reference servo patterns to write the next reference servo patterns at the next radial position. During the first pass, the servo loop has no absolute reference to ensure placement of the reference servo patterns at the appropriate radius. After the first pass finishes the complete stroke, a second pass writes the final servo patterns using the reference servo patterns to find the appropriate positions. However, the second pass substantially increases the self-servo writing time.

There is, therefore, a need for improved disk drive self-servo writing which reduces servo writer time, reduces self-servo writing time, improves performance and is simple to implement.

SUMMARY OF THE INVENTION

The present invention satisfies these needs. The present invention provides a disk drive with a head and a disk, spiral patterns are located on the disk, and the disk drive self-writes servo patterns on the disk using the spiral patterns as a reference for servoing the head.

In an embodiment, the disk drive writes the servo patterns using the spiral patterns and preliminary servo patterns as a reference for servoing the head. For example, the preliminary servo patterns are used to determine repeatable runout of the spiral patterns, and the disk drive writes the servo patterns using the spiral patterns and the repeatable runout for servoing the head.

In another embodiment, the disk drive reads each spiral pattern with multiple timing windows to provide multiple signal amplitudes of a read signal and uses the signal amplitudes for servoing the head. For example, a first timing window is aligned with a first space-delimited burst at a rising edge of the read signal to provide a first average signal amplitude, a second timing window is aligned with a second space-delimited burst at a falling edge of the read signal to provide a second average signal amplitude, and the signal amplitudes are used for servoing the head.

BRIEF DESCRIPTION OF DRAWINGS

These and other features, aspects and advantages of the present invention will become understood with reference to the following description, appended claims and accompanying figures where:

DETAILED DESCRIPTION OF PREFERRED EMBODIMENT

Figure 1:
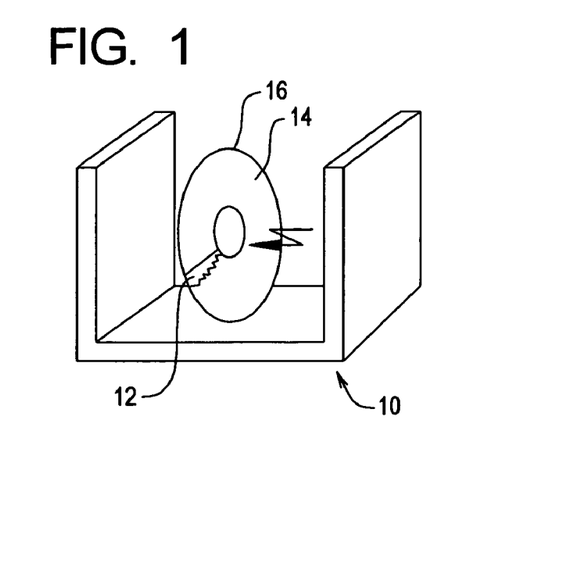
FIG. 1 shows a diagrammatic view of a printing station for printing a reference pattern on a reference disk.

FIG. 1 shows a printing station 10 that writes a reference pattern 12 to a disk surface 14 of a magnetic reference disk 16.

Figure 2A:
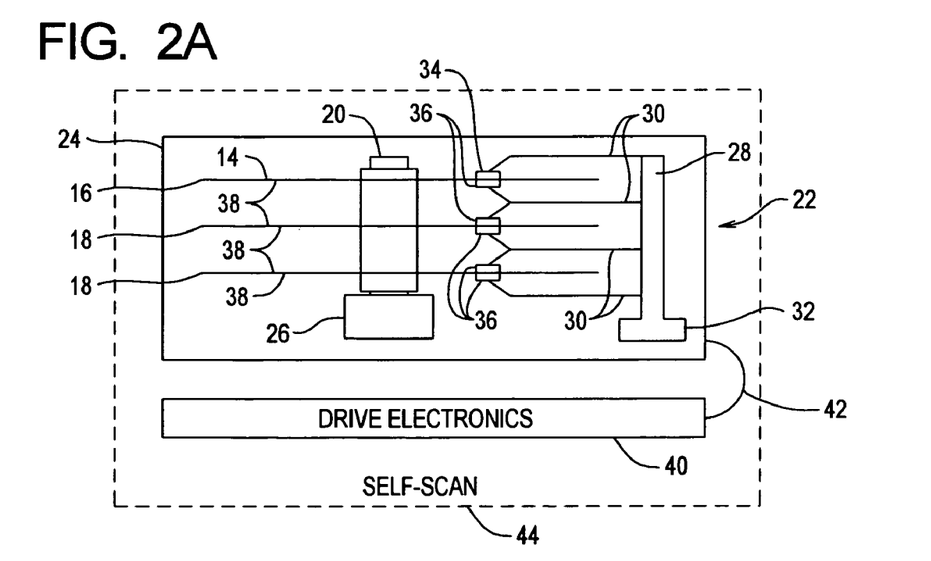
FIG. 2A shows a diagrammatic view of a disk drive including the reference disk, several blank disks and drive electronics for self-servo writing using the reference pattern in a self-scan station.

FIG. 2A shows the reference disk 16 and other disks 18 assembled on a spindle 20 of a disk drive 22 being assembled. The spindle 20 is mounted within a head-disk assembly (HDA) 24 and is rotated at a predetermined angular velocity by a spindle motor 26. A comb-like actuator assembly 28 is included in the HDA 24. The actuator assembly 28 includes head arms 30 rotated by a voice coil motor (VCM) 32 to position the transducer heads 34 and 36 adjacent to the disk surface 14 of the reference disk 16 and to the disk surfaces 38 of the disks 16 and 18. The disk surface 14 is the top surface of the reference disk 16, and the disk surfaces 38 are the bottom surface of the reference disk 16 and the top and bottom surfaces of the disks 18. The disk surface 14 includes the reference pattern 12 and the disk surfaces 38 are blank at this stage. Thus, the disks 18 are blank at this stage. After the disks 16 and 18 and the heads 34 and 36 are installed, the HDA 24 is enclosed by a cover to prevent unwanted particulate contamination. The drive electronics 40, such as a printed circuit board (PCB) carrying large scale integrated circuits and other components, is mechanically attached to the HDA 24 and is electrically connected to the HDA 24 by a suitable interconnection 42 to complete the mechanical assembly of the disk drive 22. The disk drive 22 is then placed in a self-scan station 44 and connected to a suitable power supply, and a control and status collection computer (not shown) collects data about the disk drive 22 during self-scan procedures.

The drive electronics 40 controls the head 34 to read the reference pattern 12 from the reference disk 16, and in turn enables the heads 34 and 36 to write final servo patterns in circular and concentric servo tracks on the disks 16 and 18. The final servo patterns are used by a servo loop in the drive electronics 40 to position the heads 34 and 36 over target tracks on the disks 16 and 18 to record and playback user data.

Figure 2B:
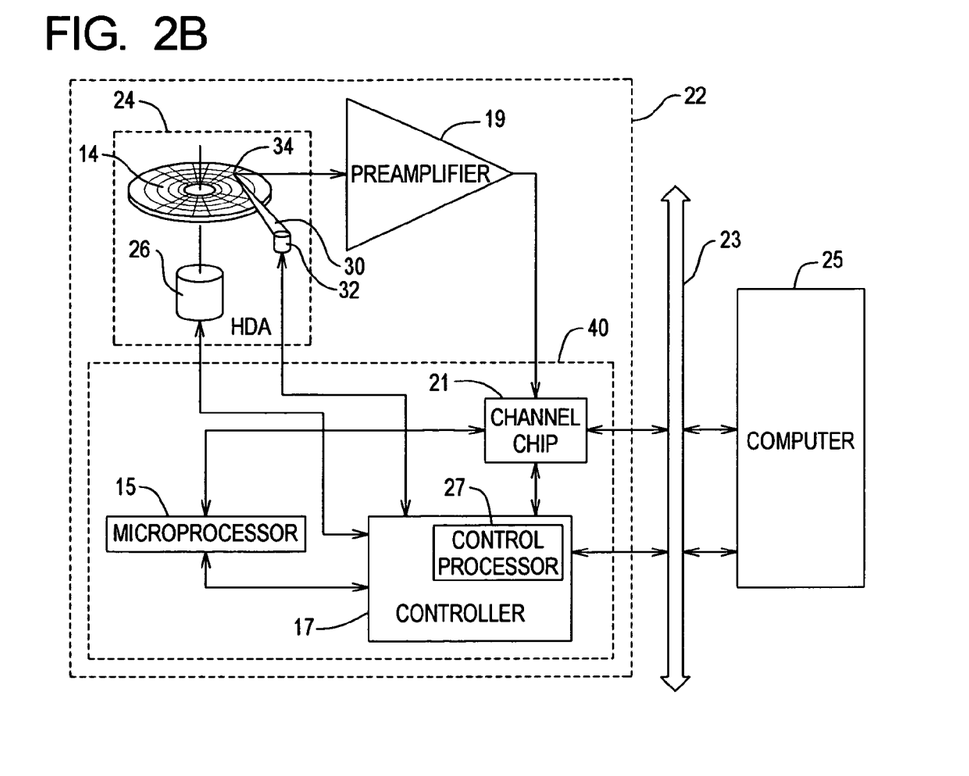
FIG. 2B shows a simplified diagram the disk drive and a computer and includes details the drive electronics.

FIG. 2B shows the disk drive 22 connected to a computer 25 via a bus 23. The disk drive 22 includes a preamplifier 19 for amplifying read signals provided by the heads 34 and 36. The drive electronics 40 includes a microprocessor 15 for servo loop control of the disk drive 22, a controller 17 (including a control processor 27) primarily for controlling data flow communications with the computer 25 via the bus 23 and also for controlling components of the disk drive 22, and a channel chip 21 for processing data transferred between the microprocessor 15, the controller 17, the preamplifier 19 and the computer 25. Alternatively, the microprocessor 15 can be a component of the controller 17. The microprocessor 15 can include an integrated circuit processor chip which performs floating point arithmetic, integer mathematics, transforms, etc. The computer 25 can include the status collection computer.

Figure 2C:
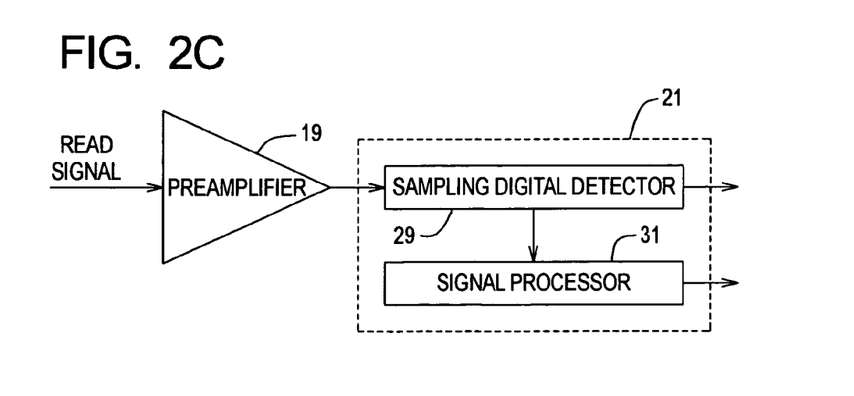
FIG. 2C shows a simplified diagram of a channel chip in the drive electronics.

FIG. 2C shows a simplified version of the channel chip 21. The channel chip 21 includes a sampling digital detector 29 coupled to the preamplifier 19 for digitally sampling the read signals from the heads 34 and 36 in response to reading from the disks 16 and 18. A signal processor 31 receives digital samples from the sampling digital detector 29 and processes the digital samples to extract position information embedded in the amplitude and phase of the read signals. The channel chip 21 provides the measurements of the signal processor 31 to the microprocessor 15 for head position detection, servoing, head positioning and servo writing.

The present invention includes (1) the reference pattern 12 instead of coarsely-spaced servo patterns from conventional skip-track and sync-skip processes which require more time, and (2) the disk drive 22 positioning the heads 34 and 36 using the reference pattern 12 as the disk drive 22 self-servo writes the final servo patterns to concentric and circular servo tracks on the disks 16 and 38.

Figure 3:
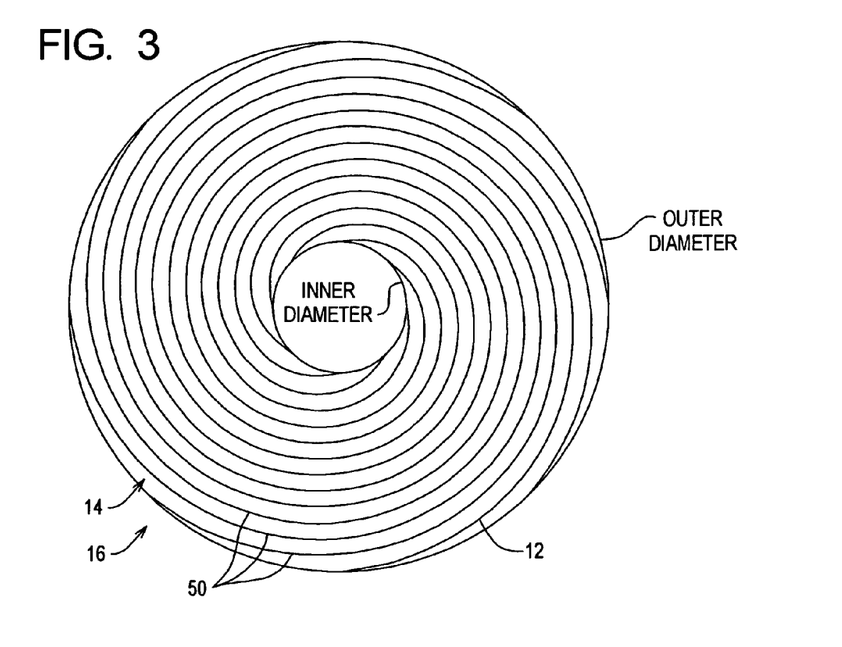
FIG. 3 shows spiral patterns of the reference pattern on the reference disk.

FIG. 3 shows the reference pattern 12 on the reference disk 16. The reference pattern 12 is composed of spiral patterns 50. The spiral patterns 50 are each an essentially continuous high frequency pattern of bursts that extends from an inner diameter (ID) to an outer diameter (OD) of the reference disk 16. The spiral patterns 50 can all be read at a constant radius during a single revolution of the reference disk 16.

Figure 4A:
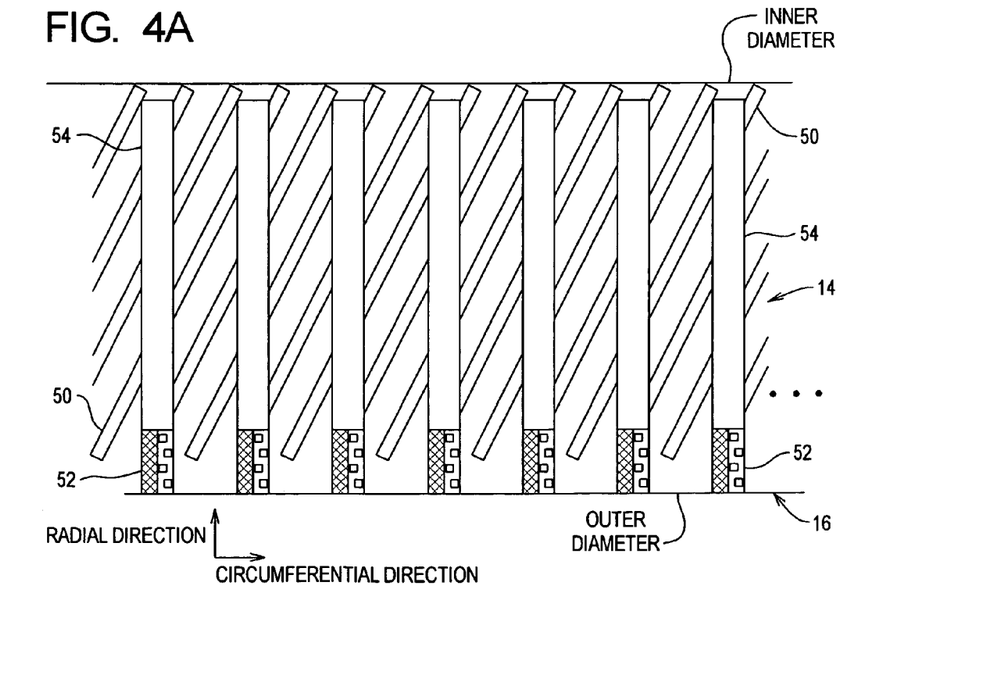
FIG. 4A shows the spiral patterns, preliminary servo patterns and servo spokes on the reference disk.

FIG. 4A shows a linear view of the spiral patterns 50, the preliminary servo patterns 52 and the servo spokes 54 on the reference disk 16. The preliminary servo patterns 52 are located at the OD of the reference disk 16, although alternatively, they can be located at the ID of the reference disk 16. The preliminary servo patterns 52 are also located in circular and concentric servo tracks on the reference disk 16. The servo spokes 54 extend radially from the preliminary servo patterns 52 towards the ID of the reference disk 16 and traverse most of the radial distance between the ID and OD of the reference disk 16. The servo spokes 54 also overwrite the spiral patterns 50 where they intersect. Furthermore, the servo spokes 54 include final servo patterns that are located in circular and concentric servo tracks on the reference disk 16.

The reference pattern 12 and the preliminary servo patterns 52 can be provided on the reference disk 16 using the printing station 10 before the reference disk 16 is installed in the HDA 24, as discussed above. Alternatively, the reference pattern 12 and the preliminary servo patterns 52 can be provided on the reference disk 16 using the head 34 and a servo writer after the reference disk 16 is installed in the HDA 24. For example, the spiral patterns 50 are written sequentially and continuously except for a minimal gap or interruption between the bursts. Each spiral pattern 50 is written by the head 34 as the head 34 moves from the OD to the ID (or the ID to the OD) of the reference disk 16 at a constant clock and pitch while the reference disk 16 spins 10 to 50 revolutions. The pitch is the angle between the spiral pattern 50 and a circular track, that is, the slew velocity (radius versus disk angle) that the spiral pattern 50 is written at, with the radius measured in LPS counts, tracks or micro-inches, and the disk angle measured in radians, degrees, clock ticks, or spokes.

The disk drive 22 uses the preliminary servo patterns 52 to spin-up to operating speed, acquire servo lock, and read disk-ware.

The disk drive 22 also uses the preliminary servo patterns 52 to characterize the spiral patterns 50. The characteristic can be a timing characteristic between the spiral patterns 50 and the preliminary servo patterns 52. For example, the disk drive 22 locks onto the preliminary servo patterns 52 and characterizes the repeatable runout (RRO) of the spiral patterns 50. The RRO can be due to eccentricity of the spiral patterns 50 relative to the center of the reference disk 16. The spiral patterns 50 each have a starting point between a pair of the preliminary servo patterns 52, at which point the RRO characterization begins. Since the preliminary servo patterns 52 are radially located at the OD of the reference disk 16, the preliminary servo patterns 52 characterize the RRO of the spiral patterns 50 at the OD of the reference disk 16. An individual spiral pattern 50 has nearly the same RRO from track-to-track. Thus, the RRO is measured/characterized once for the spiral pattern 50 at the OD of the reference disk 16, and once characterized, is similar from one track to the next.

The disk drive 22 uses the spiral patterns 50 and the characterized RRO during a self-scan process to servo the head 34 for self-servo writing the servo spokes 54. The disk drive 22 locks onto to the spiral patterns 50 using a position detection method, as described below. The disk drive 22 then slews to the starting point just past the preliminary servo patterns 52, writes final servo patterns in the servo spokes 54, seeks to the next half-track, writes the next pass of final servo patterns in the servo spoke 54, and so on. As a result, the servo spokes 54 overwrite portions of the spiral patterns 50. Moreover, the RRO in the spiral patterns 50 is accounted for in determining the relative position of the head 34 as the spiral patterns 50 rotate under the head 34. Residual adjustment can be accumulated across many tracks while the self-servo writing proceeds.

Since the spiral patterns 50 have portions overwritten by the servo spokes 54, the spiral patterns 50 generally outnumber the servo spokes 54. For example, the number of the spiral patterns 50 is about 250, which is twice or more the number of the servo spokes 54.

The spiral patterns 50 are of primary significance for self-servo writing the servo spokes 54, and the preliminary servo patterns 52 enhance self-servo writing the servo spokes 54. Furthermore, the spiral patterns 50 and the preliminary servo patterns 52 provide a reference for self-servo writing the servo spokes 54.

The disk drive 22 uses the servo spokes 54 a servo loop in the drive electronics 40 to position the heads 34 and 36 over data tracks on the disks 16 and 18 to record and playback user data on the disks 16 and 18.

Figure 4B:
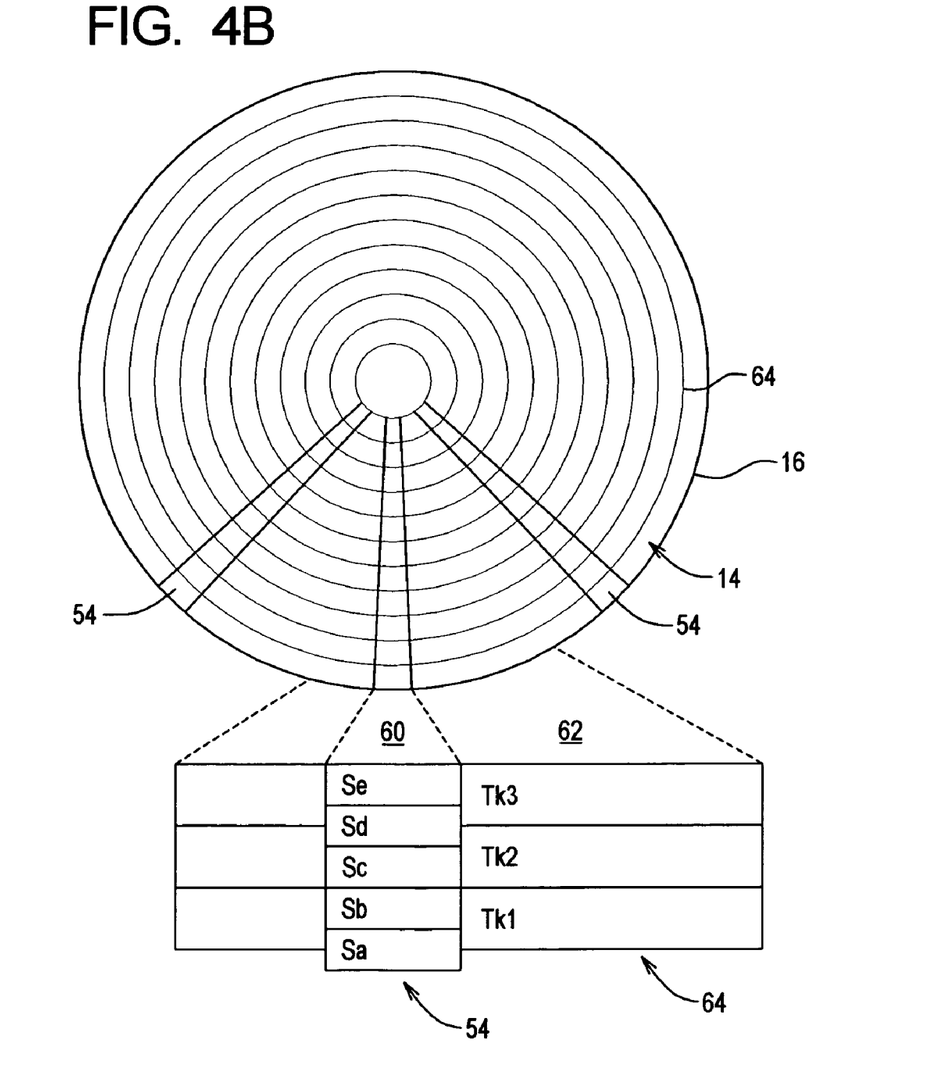
FIG. 4B shows servo tracks and data tracks on the reference disk.

FIG. 4B shows servo tracks 60 and data tracks 62 on the reference disk 16. Although disk surface 14 is shown, it is representative of the other disk surfaces 38. The servo tracks 60 and the data tracks 62 are circular and concentric tracks. The servo tracks 60 are formed by the servo spokes 54 and include servo sectors that contain the final servo patterns. Thus, the disk drive 22 self-writes the servo tracks 60 as the servo spokes 54 and vice-versa. The final servo patterns include a series of phase-coherent digital fields followed by a series of constant frequency servo bursts. The servo bursts are circumferentially sequential, radially staggered, and provided in sufficient number that fractional amplitudes of the read signal generated by the head 34 in response to portions of one or more of the servo bursts passing under the head 34 enable the disk drive 22 to determine and maintain the proper position of the head 34 relative to each data track 62. The data tracks 62 include individually addressable data sectors 64 in which user data is stored. The data sectors 64 are separated by the embedded servo sectors in the servo spokes 54.

After the disk drive 22 self-servo writes the servo spokes 54 (and thus the servo tracks 60), the disk drive 22 can write the data tracks 62 at any radial position relative to the servo tracks 60. For example, five servo tracks 60 designated as Sa, Sb, Sc, Sd and Se are shown in relation to three data tracks 62 designated as Tk1, Tk2 and Tk3. The servo tracks 60 each include radially similarly situated servo information in the servo spokes 54. For example, the servo track Se contains servo information at essentially same radial distance from the center of the reference disk 16, the servo track Sd contains servo information at essentially same radial distance from the center of the reference disk 16, etc.

The disk drive 22 locks onto to the spiral patterns 50 to self-write the servo spokes 54 using a position detection method that relies on coherence of the bursts in the spiral patterns 50. If the reference pattern 12 is written using a servo writer, the bursts in each spiral pattern 50 are clocked by the servo writer to ensure coherence.

During the self-servo writing, as the reference disk 16 rotates and the head 34 is stationary, the head 34 generates a read signal in response to each spiral pattern 50 that it reads from the reference disk 16. The read signal has a signal envelope with a football-like shape that includes leading and trailing edges. The disk drive 22 determines the position of the head 34 by measuring the amplitudes of the leading and trailing edges using successive timing windows. For example, a first timing window measures the leading edge and a second timing window measures the trailing edge.

The timing of the timing windows is fixed to the rotation of the reference disk 16. As the head 34 moves towards the ID or the OD of the reference disk 16, for instance due to RRO in the spiral pattern 50, the timing windows stay open while the signal envelope moves according to the spiral pattern 50 pitch and off-track error. The disk drive 22 uses the timing windows to measure the amount of signal envelope movement and translate it into the position of the head 34 relative to the spiral patterns 50.

Furthermore, the timing for the timing windows is derived from a clock that coasts from one spiral pattern 50 to another. A spiral pattern 50 rotates under the head 34 to provide a read signal that is sampled by the timing windows, and the read signal is used to determine when to open the timing windows for the next spiral pattern 50. Thus, the self-servo writing clock propagates from one spiral pattern 50 to another.

Figure 5:
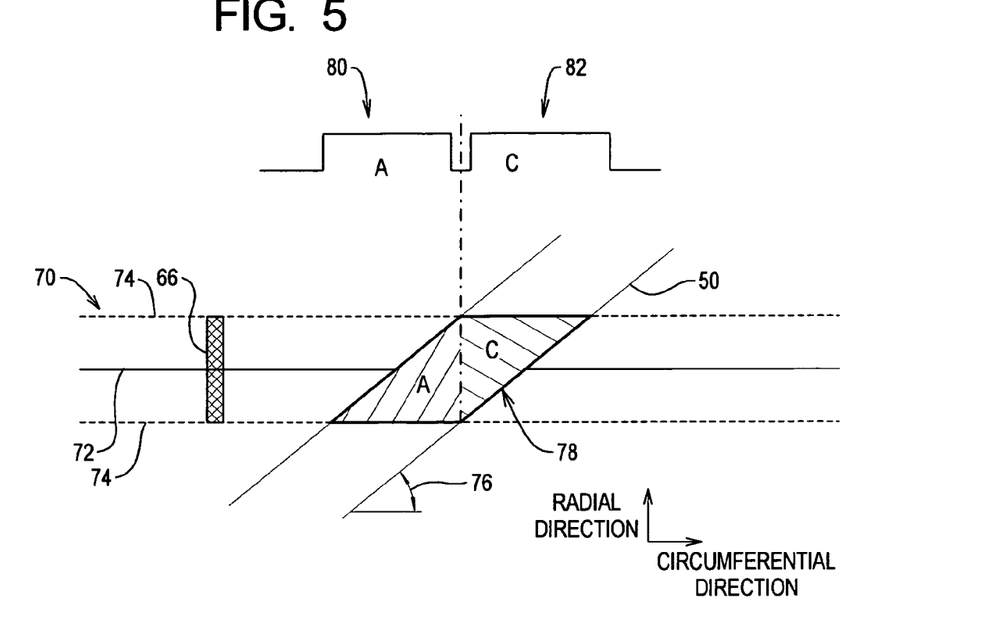
FIG. 5 shows a first position detection method.
Figure 6:
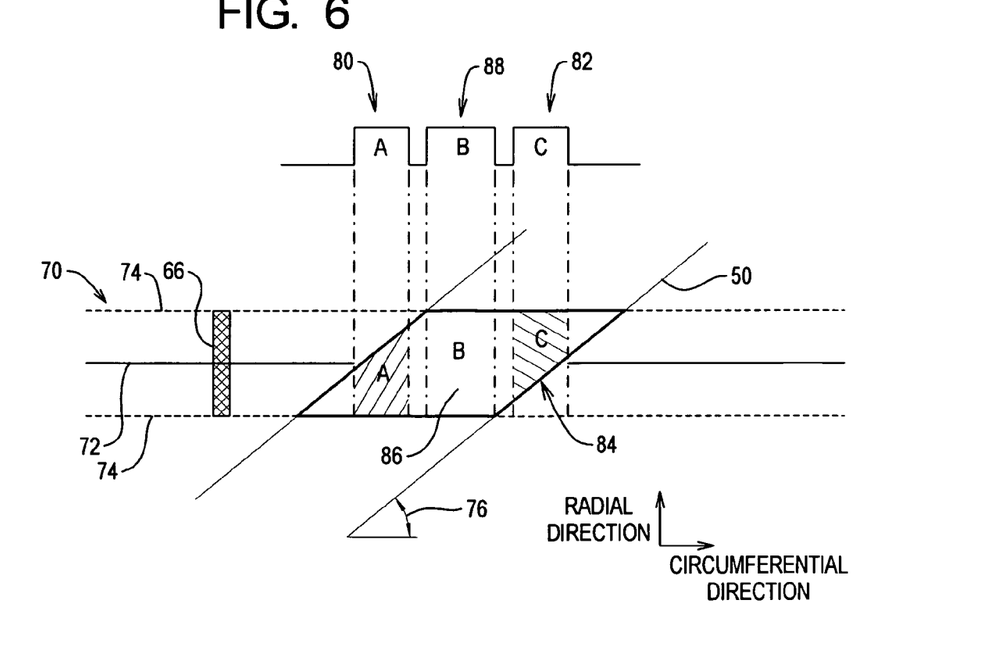
FIG. 6 shows a second position detection method.
Figure 7:
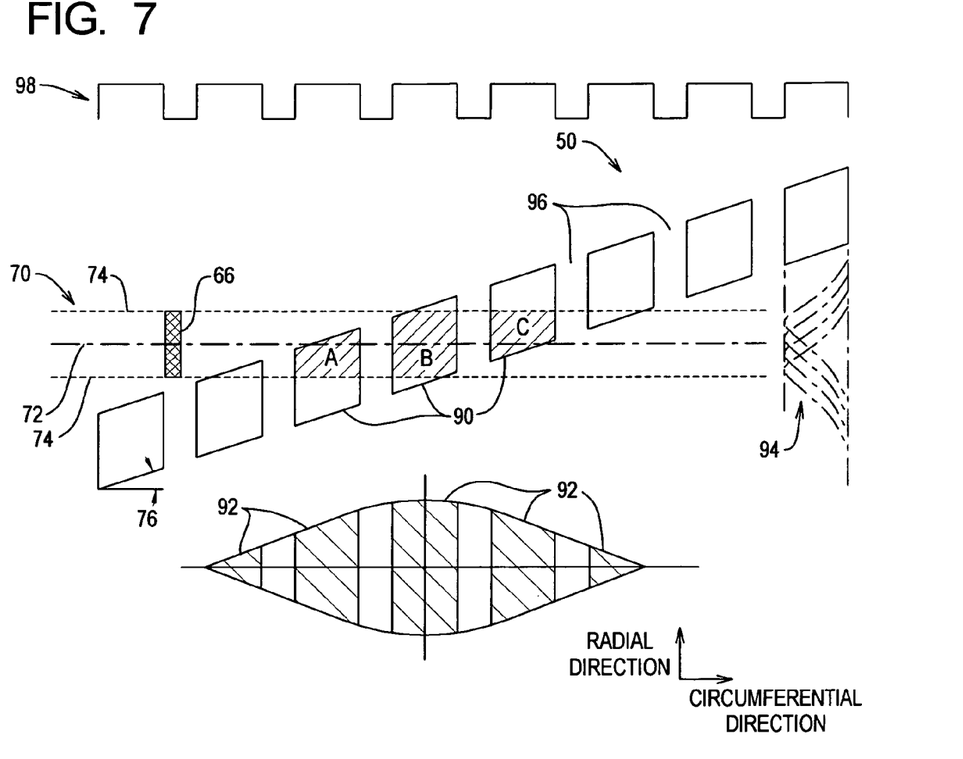
FIG. 7 shows a third position detection method.

FIGS. 5, 6 and 7 show first, second and third position detection methods, respectively. The circumferential (down-track) direction is horizontal, and the radial (cross-track) direction is vertical. A reader 66 of the head 34 follows a circular track on the reference disk 16 along a circumferential path 70 that has a centerline 72 and boundaries 74. The spiral pattern 50 is skewed relative to the path 70 at a pitch angle 76. As the reader 66 crosses the spiral pattern 50, the reader 66 generates a read signal in response to the spiral pattern 50. The read signal has a signal envelope with a football-like shape that includes leading (rising) and trailing (falling) edges when viewed on an oscilloscope. The read signal increases and then decreases in proportion to the amount of overlap between the reader 66 and the spiral pattern 50. The reader 66 may be narrower than the spiral pattern 50, in which case the read signal has a flat section at its maximum point when the reader 66 is within the spiral pattern 50. The read signal is sampled during successive timing windows shown by the upper square waves. The signal amplitudes of the read signal that are sampled and measured during the timing windows are then used to position the head 34 as the head 34 writes a servo spoke 54 during the self-servo writing. Then, as the reader 66 crosses the next spiral pattern 50, the next read signal is sampled during the timing windows and the signal amplitudes are used to position the head 34 as the head 34 writes the next servo spoke 54 during the self-servo writing. The process repeats as the head 34 reads the next spiral pattern 50 and then writes the next servo spoke 54.

FIG. 5 shows the first position detection method. The path 70 crosses over an area 78 of the spiral pattern 50. The read signal is sampled during the timing windows 80 and 82, once by the timing window 80 during the leading or rising edge A, and again by the timing window 82 during the trailing or falling edge C.

The timing window 80 is nominally aligned with the leading edge, begins before the leading edge, ends during the leading edge, includes essentially the entire leading edge and excludes the trailing edge. The timing window 82 is nominally aligned with the trailing edge, begins during the trailing edge, ends after the trailing edge, includes essentially the entire trailing edge and excludes the leading edge.

If the timing T of the timing windows 80 and 82 is not changed, any radial variation in the path 70 relative to the spiral pattern 50 will cause a corresponding variation in the signal amplitudes of the A and C measurements. The difference in the signal amplitudes of the A and C measurements indicates the radial position of the head 34 relative to the spiral pattern 50. The head 34 is at the correct radial position when the difference is zero.

A target position of the head 34 defines the desired timing T of the timing windows 80 and 82 ($T_A$ for timing window 80 with measurement A) as:

$$T_A(\text{target}) = T_{A0} + K_1(\text{target position} - \text{reference position})$$

where the multiplier $K_1$ is proportional to the slew-rate at which the spiral pattern 50 (reference position) is written (microseconds/track).

The position error between the target position and the actual position of the head 34 is obtained by:

$$\text{position error} = K_2(\text{amplitude}(C) - \text{amplitude}(A))$$

where the multiplier $K_2$ is proportional to the width and sensitivity of the reader 66 (tracks/full-scale amplitude).

The read signal measurement is analogous to that of traditional servo bursts and can be accomplished with the same traditional hardware.

The spiral patterns 50 have no gaps except where the servo spokes 54 are written, and the timing windows 80 and 82 separate the signal envelope into two halves (A and C). The disk drive 22 attempts to equalize the integrated signal on either side of the signal envelope split to keep the head 34 in a circular track as the servo spokes 54 are written.

FIG. 6 shows the second position detection method. The path 70 crosses over an area 84 of the spiral pattern 50. The area 84 includes high frequency bursts separated by an information field 86. The read signal is sampled during the timing windows 80, 82 and 88, once by the timing window 80 at the burst during the leading edge A, again by the timing window 88 at the information field 86 during the intermediate or flat edge B, and again by the timing window 82 at the burst during the trailing edge C.

The timing window 80 is nominally aligned with the leading edge, begins and ends during and is within the leading edge and excludes the flat and trailing edges. The timing window 88 is between the timing windows 80 and 82, is nominally aligned with the flat edge and excludes the leading and trailing edges. The timing window 82 is nominally aligned with the trailing edge, begins and ends during and is within the trailing edge and excludes the flat and leading edges.

The position of the head 34 is determined in the same manner as the first position detection method. In addition, the information field 86 provides a gap between the leading and trailing bursts to prevent small variations in the timing of the timing windows 80 and 82 from affecting the signal amplitudes of the A and C measurements because the edges of the timing windows 80 and 82 enter the information field 86 but do not extend across the information field 86 to the burst on the opposite side.

The information field 86 includes digital information, similar that of traditional servo patterns, such as a track number, ordinal spiral pattern number, automatic gain control pattern, timing pattern, synchronization pattern and/or gray code.

FIG. 7 shows the third position detection method. The spiral pattern 50 is a series of high frequency bursts 90 (A, B, C) that have amplitudes 92, include high frequency patterns 94 and are separated by gaps 96. The read signal is sampled during the timing windows 98, with each burst 90 is sampled by a corresponding timing window 98. The timing windows 98 are nominally aligned with cover the bursts 90.

The signal amplitude profile is comparable to that of the second position detection method. Furthermore, arbitrary position variations can be handled by reading enough of the bursts 90. Although the amplitude 92 of each burst 90 is not constant across the length of the burst 90, this is inconsequential because the measurement of the burst 90 represents the simple integration (or average value) of the burst 90.

The position of the head 34 is determined in the same manner as the first position detection method. In addition, the gaps 96 between the bursts 90 prevent small variations in the timing of the timing windows 98 from affecting the signal amplitudes of the A and C measurements because the edges of the timing windows 98 enter the gaps 96 but do not extend across the gaps 96 to the bursts 90 on the opposite side.

In this example, there are two bursts 90 per track and the gaps 96 are about ten percent of the bursts 90. Because the writer of the head 34 is smaller than a track width, the crossover points in the amplitudes 92 are less than fifty percent. This is similar to an untrimmed two-pass per track servo pattern. Alternatively, there can be three bursts 90 for every two tracks, which is similar to an untrimmed 3/2 servo pattern.

Since the bursts 90 are written on the same pass (during a single revolution of the reference disk 16) and the bursts in the servo spokes 54 are written on different passes (during multiple revolutions of the reference disk 16), the bursts 90 have similar off-track properties yet less noise than trimmed bursts in the servo spokes 54.

The first, second and third position detection methods have various tradeoffs. The first position detection method is relatively simple (compared to the other two) but the accuracy depends on precise timing of the timing windows. The track profile is linear only during the flats of the signal envelope, and the flat length depends on the head 34 reader-to-writer width ratio. In addition, the first position detection method detects movement across essentially the entire leading and trailing edges, whereas the second position detection method detects movement only over the width of the first and second timing windows. The second position detection method provides more robust timing accuracy than the first position detection method and is linear over a wider range than the first position detection method but does not have as high a signal level as the first position detection method. The third position detection method also provides more robust timing accuracy than the first position detection method. In addition, the third position detection method provides position information at any track location, whereas the first and second position detection methods provide position information primarily in the vicinity of specific track locations (the target position).

Figure 8:
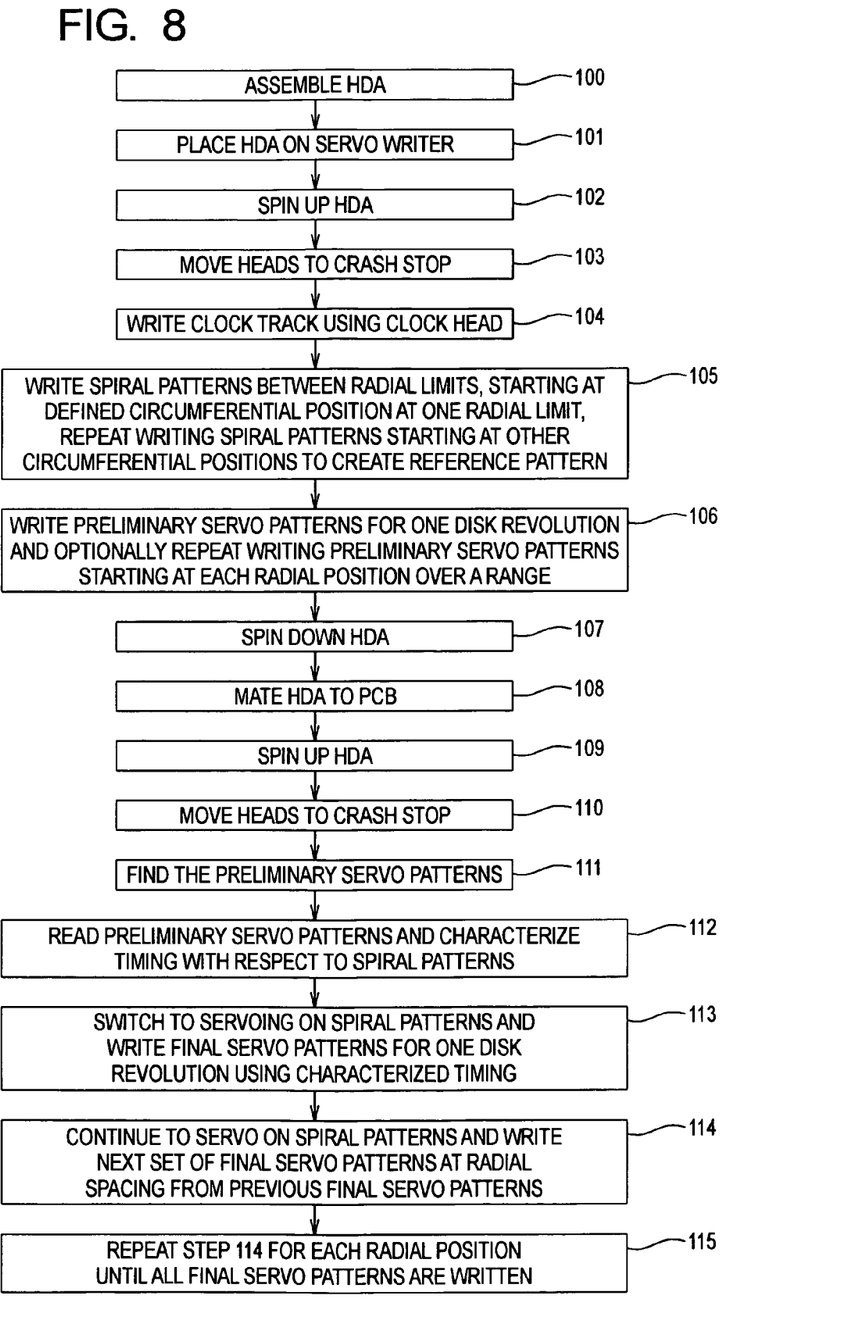
FIG. 8 shows a self-servo writing process using the reference pattern and the preliminary servo patterns.

FIG. 8 shows a self-servo writing process that includes writing the spiral patterns 50 and the preliminary servo patterns 52 on the reference disk 16 using a servo writer, then assembling the HDA 24 to the drive electronics 40, then characterizing the timing of the spiral patterns 50, and then servoing on the spiral patterns 50 using the characterized timing for self-writing the servo spokes 54. The process includes the following steps:

1. Assemble the HDA 24 (step 100);
2. Place the HDA 24 on the servo writer (step 101);
3. Spin up the HDA 24 (step 102);
4. Move the heads 34 and 36 to the crash-stop and reset the positioning system (step 103);
5. Write a clock track on one of the disks 16 and 38 using a clock head (step 104);
6. While moving the heads 34 and 36 in a spiral, coordinated with the clock track, write a spiral pattern 50 between the radial limits (ID and OD) of the reference disk 16, starting at a defined circumferential position at one radial limit, and repeat writing the spiral patterns 50 starting at other equally-spaced circumferential positions to create the reference pattern 12 (step 105);
7. Write the preliminary servo patterns 52 for one revolution of the reference disk 16, and optionally, repeat writing the preliminary servo patterns 52 starting at each radial position over a range to create a band of the preliminary servo patterns 52 (step 106);
8. Spin down the HDA 24 (step 107);
9. Remove the HDA 24 from the servo writer, and mate the HDA 24 to the drive electronics 40 (step 108);
10. Perform a self-scan post-servo writer process, including:
11. Spin up the HDA 24 (step 109);
12. Move the heads 34 and 36 to the crash-stop (step 110);
13. Find the preliminary servo patterns 52 (step 111);
14. Read the preliminary servo patterns 52 and characterize timing with respect to the spiral patterns 50 (step 112). The preliminary servo patterns 52 include unique information defining their position, which can be read by the head 34 during a single pass over the preliminary servo patterns 52. For example, the head 34 may read "track 50001, sector 7" from a preliminary servo pattern 52. In contrast, the position information available from the spiral patterns 50 may not be unique. For example, the head 34 may only be able to read "01" from a spiral pattern 50. In order to determine absolute position, it is convenient to read a preliminary servo pattern 52, then switch to a spiral pattern 50 at the same location, and keep track of changes in position and time from one spiral pattern 50 to the next;
15. Switch from servoing on the preliminary servo patterns 52 to servoing on the spiral patterns 50, and write concentric final servo patterns in the servo spokes 54 for one revolution of the reference disk 16 based on the characterized timing (step 113). In order to smoothly splice into the reference pattern 12, it is useful to characterize the fine-grained irregularities in the reference pattern 12. The irregularities may come from thermal or mechanical shifts in position because the spiral patterns 50 were written by the servo writer. This is particularly useful for bulk-writing in which the reference disk 16 is placed in the disk drive 22 after the spiral patterns 50 have been written by the printing station 10. If the reference disk 16 is installed in the HDA 24 slightly off-center, the spiral patterns 50 may have substantial systematic position error in the disk drive 22, however, the characterized timing accounts for such errors. Alternatively, steps 112 and 113 can be combined into a simpler step, after step 111, of reading the preliminary servo patterns 52 to establish an initial reference position for the spiral patterns 50;

16. Continue to servo on the spiral patterns 50 and write a next set of concentric final servo patterns in the servo spokes 54 at a predetermined radial spacing (track-to-track) from the previously written final servo patterns (step 114); and 17. Repeat step 114 for each radial position from the OD to the ID of the reference disk 16 until all the final servo patterns are written (for instance, until the crash-stop limit is reached) (step 115).

Figure 9:
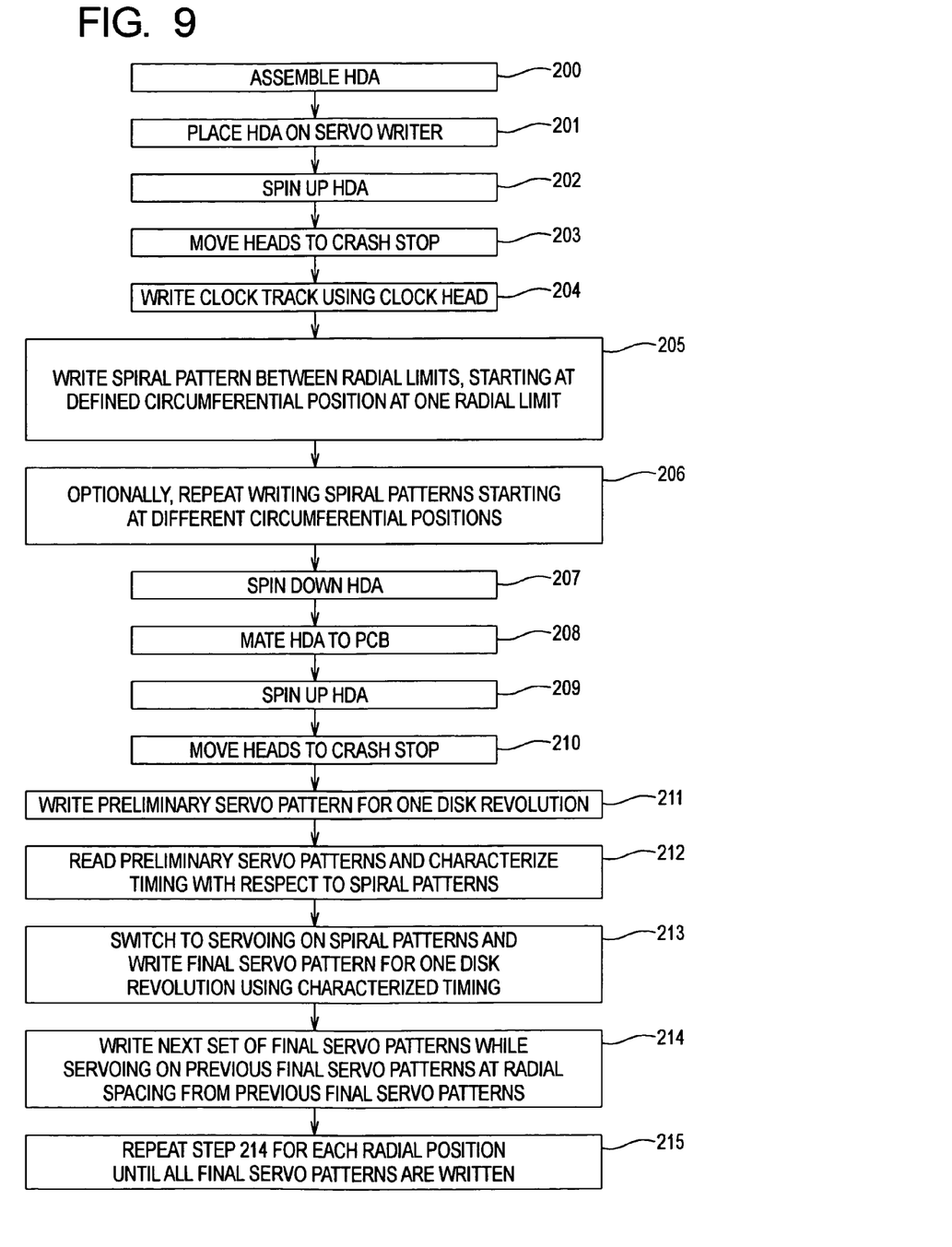
FIG. 9 shows another self-servo writing process using the reference pattern and the preliminary servo patterns.

FIG. 9 shows another self-servo writing process that includes writing a few spiral patterns 50 on the reference disk 16 using a servo writer, then assembling the HDA 24 to the drive electronics 40, then writing the preliminary servo patterns 52 on the reference disk 16, then characterizing the timing of the spiral patterns 50, then servoing on the spiral patterns 50 using the characterized timing to position the head 34 to begin self-writing the servo spokes 54, and then servoing on the previously written final servo patterns in the servo spokes 54 to continue self-writing the servo spokes 54. The process includes the following steps:

1. Assemble the HDA 24 (step 200);
2. Place the HDA 24 on the servo writer (step 201);
3. Spin up the HDA 24 (step 202);
4. Move the heads 34 and 36 to the crash-stop and reset the positioning system (step 203);
5. Write a clock track on one of the disks 16 and 38 using a clock head (step 204);
6. While moving the heads 34 and 36 in a spiral, coordinated with the clock track, write a spiral pattern 50 between the radial limits of the reference disk 16, starting at a defined circumferential position at one radial limit (step 205);
7. Optionally repeat step 205 writing more spiral patterns 50 starting at different circumferential positions (step 206);
8. Spin down the HDA 24 (step 207);
9. Remove the HDA 24 from the servo writer and mate the HDA 24 to the drive electronics 40 (step 208);
10. Perform a self-scan post-servo writer process, including:
11. Spin up the HDA 24 (step 209);
12. Move the heads 34 and 36 to the crash-stop (step 210);
13. Write the preliminary servo patterns 52 for one revolution of the reference disk 16 (step 211);
14. Read the preliminary servo patterns 52 and characterize timing with respect to the spiral patterns 50 (step 212);
15. Switch from servoing on the preliminary servo patterns 52 to servoing on the spiral patterns 50 and write concentric final servo patterns in servo spokes 54 for one revolution of the reference disk 16 using the characterized timing (step 213);

16. Switch from servoing on the spiral patterns 50 to servoing on the previously written final servo patterns and write a next set of concentric final servo patterns in the servo spokes 54 at a predetermined radial spacing from the previously written final servo patterns (step 214); and 17. Repeat step 214 for each radial position from OD to the ID of the reference disk 16 until all the final servo patterns are written (step 215).

The self-servo writing can be implemented as firmware in the drive electronics 40 by configuring the microprocessor 15, the controller 17 and/or the channel chip 21 to functionally provide a position detector and a control loop. The self-servo writing can also be implemented in other ways such as ASIC or software.

A quantitative example of the self-servo writing is as follows:

RPM=6000
TPI=25,000 (tracks per inch)
full stroke=1 inch (TPI=tracks per full stroke)
clock speed=100 MHz
servo spokes=125
bursts per track=2
Tcell per burst=1000
bits per revolution=clock speed/(RPM/60)=100,000,000/(6000/60)=1,000,000

To determine the pitch angle 78 for writing the spiral patterns 50, the following relation is used:

revolutions per spiral pattern (revolutions per full-stroke)=(tracks per full stroke)/(bits per revolution/((bits per burst)(bursts per track)))=25,000/(1,000,000/(1000×2))=50

50 revolutions per spiral pattern=4 tracks per spoke
The self-servo writing time is as follows:

(125 servo spokes)(2 spiral patterns per servo spoke) (50 revolutions per spiral pattern)/(100 revolutions per second)=125 seconds The present invention has been described in considerable detail with reference to certain preferred versions thereof; however, other versions are possible. Therefore, the spirit and scope of the appended claims should not be limited to the description of the preferred versions contained herein. In particular, the present invention may be implemented equivalently in hardware, software, firmware, and/or other available functional components or building blocks.

What is claimed is:

1. A method of self-servo writing in a disk drive, wherein the disk drive includes a disk having a clock track, the method comprising:
   writing a spiral pattern on the disk, wherein the spiral pattern is coordinated with the clock track;
   writing a preliminary servo pattern on the disk during a single revolution of the disk; and
   writing an additional servo pattern on the disk using the spiral pattern and the preliminary servo pattern as a reference.

2. The method of claim 1, including reading the preliminary servo pattern from the disk, and determining a timing characteristic between the spiral pattern and the preliminary servo pattern.

3. The method of claim 2, including servoing on the spiral pattern and writing the additional servo pattern using the timing characteristic.

4. The method of claim 3, including writing the additional servo pattern during a single revolution of the disk.

5. The method of claim 4, including servoing on the spiral pattern and writing another servo pattern on the disk at a predetermined track spacing relative to the additional servo pattern.

6. The method of claim 1, including servoing on the additional servo pattern and writing another servo pattern on the disk at a predetermined track spacing relative to the additional servo pattern.

7. The method of claim 1, including servoing on the spiral pattern until a desired radial and timing position is reached and then writing the additional servo pattern.

8. The method of claim 1, wherein the spiral pattern includes an essentially continuous high frequency pattern written across multiple radial positions on the disk.

9. The method of claim 1, wherein the additional servo pattern is a final servo pattern.

10. The method of claim 1, wherein the additional servo pattern is in a servo spoke that overwrites radially spaced portions of the spiral pattern.

11. A method of self-servo writing in a disk drive, wherein the disk drive includes a head and a disk, the method comprising:
    writing a spiral pattern on the disk;
    writing a preliminary servo pattern on the disk;
    reading the preliminary servo pattern from the disk to generate a read signal;
    determining a timing characteristic of the spiral pattern using the read signal; and
    writing an additional servo pattern on the disk using the spiral pattern and the timing characteristic to position the head.

12. The method of claim 11, including writing a clock track on the disk and then writing the spiral pattern using the clock track.

13. The method of claim 11, including writing the spiral pattern and then writing the preliminary servo pattern.

14. The method of claim 11, including writing the spiral pattern during multiple revolutions of the disk and writing the preliminary servo pattern during a single revolution of the disk.

15. The method of claim 11, wherein the spiral pattern extends across multiple servo tracks on the disk and the preliminary servo pattern is in a single servo track on the disk.

16. The method of claim 11, wherein the spiral pattern is between and proximate to inner and outer diameters of the disk, and the preliminary servo pattern is proximate to one of the inner and outer diameters of the disk.

17. The method of claim 11, wherein the additional servo pattern is at a predetermined track spacing relative to the preliminary servo pattern.

18. The method of claim 11, wherein the additional servo pattern is in a servo spoke that overwrites radially offset portions of the spiral pattern.

19. The method of claim 11, wherein the additional servo pattern is a final servo pattern.

20. The method of claim 11, wherein the timing characteristic is repeatable runout.

21. A method of self-servo writing in a disk drive, wherein the disk drive includes a head and a disk, the method comprising:
    writing a spiral pattern on the disk using the head;
    writing a preliminary servo pattern on the disk using the head;
    reading the preliminary servo pattern from the disk using the head to generate a read signal;

determining repeatable runout of the spiral pattern using the read signal; and writing a final servo pattern on the disk using the head and using the spiral pattern and the repeatable runout to position the head.

22. The method of claim 21, including writing a clock track on the disk, then writing the spiral pattern using the clock track, and then writing the preliminary servo pattern without using the spiral pattern.

23. The method of claim 22, including writing the clock track, the spiral pattern and the preliminary servo pattern using an external servo writer, and then writing the final servo pattern without using the servo writer.

24. The method of claim 21, including writing the spiral pattern during multiple revolutions of the disk, writing the preliminary servo pattern during a single revolution of the disk, and writing the final servo pattern during a single revolution of the disk.

25. The method of claim 21, including reading the preliminary servo pattern to determine absolute position information, and then determining the repeatable runout.

26. The method of claim 21, including reading the preliminary servo pattern to position the head, then determining the repeatable runout, and then using the spiral pattern and the repeatable runout to position the head as the first time using the spiral pattern to position the head.

27. The method of claim 21, including writing another final servo pattern on the disk at a predetermined track spacing relative to the final servo pattern using the head and using the spiral pattern and the repeatable runout to position the head.

28. The method of claim 21, including writing another final servo pattern on the disk at a predetermined track spacing relative to the final servo pattern using the head and using the final servo pattern to position the head.

29. The method of claim 21, wherein the spiral pattern is between and proximate to inner and outer diameters of the disk, the preliminary servo pattern is proximate to one of the inner and outer diameters of the disk and to an end of the spiral pattern, and the final servo pattern is at a predetermined track spacing from the preliminary servo pattern.

30. The method of claim 21, wherein the final servo pattern is in a servo spoke that overwrites radially offset portions of the spiral pattern.

31. A method of self-servo writing in a disk drive, wherein the disk drive includes a head and a disk, the method comprising the following steps in the sequence set forth:

writing a spiral pattern and a preliminary servo pattern on the disk using the head, wherein writing the spiral pattern includes using an external servo writer;

reading the preliminary servo pattern from the disk using the head to generate a read signal;

determining repeatable runout of the spiral pattern using the read signal; and writing a final servo pattern on the disk at a predetermined track spacing relative to the preliminary servo pattern using the head and using the spiral pattern and the repeatable runout to position the head without using the servo writer.

32. The method of claim 31, including writing the spiral pattern during multiple revolutions of the disk, writing the preliminary servo pattern during a single revolution of the disk, and writing the final servo pattern during a single revolution of the disk.

33. The method of claim 31, including writing the preliminary servo pattern using the servo writer.

34. The method of claim 31, including writing the preliminary servo pattern without using the servo writer.

35. The method of claim 31, including reading the preliminary servo pattern to determine absolute position information, and then determining the repeatable runout.

36. The method of claim 31, including reading the preliminary servo pattern to position the head, then determining the repeatable runout, and then using the spiral pattern and the repeatable runout to position the head as the first time using the spiral pattern to position the head.

37. The method of claim 31, including writing another final servo pattern on the disk at a predetermined track spacing relative to the final servo pattern using the head and using the spiral pattern and the repeatable runout to position the head.

38. The method of claim 31, including writing another final servo pattern on the disk at a predetermined track spacing relative to the final servo pattern using the head and using the final servo pattern to position the head.

39. The method of claim 31, wherein the spiral pattern is between and proximate to inner and outer diameters of the disk, and the preliminary servo pattern is proximate to one of the inner and outer diameters of the disk and to a starting point of the spiral pattern.

40. The method of claim 31, wherein the final servo pattern is in a servo spoke that overwrites radially offset portions of the spiral pattern.

41. A method of self-servo writing in a disk drive, wherein the disk drive includes a head, a disk and drive electronics, the method comprising the following steps in the sequence set forth:

writing a clock track on the disk using an external servo writer;

writing a spiral pattern on the disk using the head, the clock track and the servo writer;

writing a preliminary servo pattern on the disk using the head and the servo writer without using the spiral pattern;

removing the head and the disk from the servo writer and connecting the head and the disk to the drive electronics;

reading the preliminary servo pattern from the disk using the head to generate a read signal;

determining repeatable runout of the spiral pattern using the read signal; and writing a final servo pattern on the disk at a predetermined track spacing relative to the preliminary servo pattern using the head and using the spiral pattern, the repeatable runout and the drive electronics to position the head without using the servo writer.

42. The method of claim 41, including writing the clock track using an external clock head.

43. The method of claim 41, including reading the preliminary servo pattern, determining the repeatable runout and writing the final servo pattern while the disk drive is at a self-scan station.

44. The method of claim 41, including writing the spiral pattern during multiple revolutions of the disk, writing the preliminary servo pattern during a single revolution of the disk, and writing the final servo pattern during a single revolution of the disk.

45. The method of claim 41, including reading the preliminary servo pattern to determine absolute position information, and then determining the repeatable runout.

46. The method of claim 41, including reading the preliminary servo pattern to position the head, then determining the repeatable runout, and then using the spiral pattern and the repeatable runout to position the head as the first time using the spiral pattern to position the head.

47. The method of claim 41, including writing another final servo pattern on the disk at a predetermined track spacing relative to the final servo pattern using the head and using the spiral pattern and the repeatable runout to position the head.

48. The method of claim 41, including writing another final servo pattern on the disk at a predetermined track spacing relative to the final servo pattern using the head and using the final servo pattern to position the head.

49. The method of claim 41, wherein the spiral pattern is between and proximate to inner and outer diameters of the disk, and the preliminary servo pattern is proximate to one of the inner and outer diameters of the disk and to a starting point of the spiral pattern.

50. The method of claim 41, wherein the final servo pattern is in a servo spoke that overwrites radially offset portions of the spiral pattern.

51. A method of self-servo writing in a disk drive, wherein the disk drive includes a disk having a clock track, the method comprising:
    writing a spiral pattern on the disk, wherein the spiral pattern is coordinated with the clock track and extends across multiple servo tracks on the disk;
    writing a preliminary servo pattern on the disk during a single revolution of the disk, wherein the preliminary servo pattern is in a single servo track on the disk; and
    writing an additional servo pattern on the disk using the spiral pattern and the preliminary servo pattern as a reference.

52. The method of claim 51, including reading the preliminary servo pattern from the disk, and determining a timing characteristic between the spiral pattern and the preliminary servo pattern.

53. The method of claim 52, including servoing on the spiral pattern and writing the additional servo pattern using the timing characteristic.

54. The method of claim 53, including writing the additional servo pattern during a single revolution of the disk.

55. The method of claim 54, including servoing on the spiral pattern and writing another servo pattern on the disk at a predetermined track spacing relative to the additional servo pattern.

56. The method of claim 51, including servoing on the additional servo pattern and writing another servo pattern on the disk at a predetermined track spacing relative to the additional servo pattern.

57. The method of claim 51, including servoing on the spiral pattern until a desired radial and timing position is reached and then writing the additional servo pattern.

58. The method of claim 51, wherein the spiral pattern includes an essentially continuous high frequency pattern written across multiple radial positions on the disk.

59. The method of claim 51, wherein the additional servo pattern is a final servo pattern.

60. The method of claim 51, wherein the additional servo pattern is in a servo spoke that overwrites radially spaced portions of the spiral pattern.

61. A method of self-servo writing in a disk drive, wherein the disk drive includes a head and a disk, the method comprising:
    writing a spiral pattern on the disk, wherein the spiral pattern is an essentially continuous high frequency pattern written across multiple radial positions on the disk;
    writing a preliminary servo pattern on the disk;
    reading the preliminary servo pattern from the disk to generate a read signal;
    determining a timing characteristic of the spiral pattern using the read signal; and
    writing an additional servo pattern on the disk using the spiral pattern and the timing characteristic to position the head.

62. The method of claim 61, including writing a clock track on the disk and then writing the spiral pattern using the clock track.

63. The method of claim 61, including writing the spiral pattern and then writing the preliminary servo pattern.

64. The method of claim 61, including writing the spiral pattern during multiple revolutions of the disk and writing the preliminary servo pattern during a single revolution of the disk.

65. The method of claim 61, wherein the spiral pattern extends across multiple servo tracks on the disk and the preliminary servo pattern is in a single servo track on the disk.

66. The method of claim 61, wherein the spiral pattern is between and proximate to inner and outer diameters of the disk, and the preliminary servo pattern is proximate to one of the inner and outer diameters of the disk.

67. The method of claim 61, wherein the additional servo pattern is at a predetermined track spacing relative to the preliminary servo pattern.

68. The method of claim 61, wherein the additional servo pattern is in a servo spoke that overwrites radially offset portions of the spiral pattern.

69. The method of claim 61, wherein the additional servo pattern is a final servo pattern.

70. The method of claim 61, wherein the timing characteristic is repeatable runout.

71. A method of self-servo writing in a disk drive, wherein the disk drive includes a head and a disk, the method comprising:
    writing a spiral pattern on the disk using the head, wherein the spiral pattern is an essentially continuous high frequency pattern that extends across multiple servo tracks on the disk;
    writing a preliminary servo pattern on the disk using the head, wherein the preliminary servo pattern is in a single servo track on the disk;
    reading the preliminary servo pattern from the disk using the head to generate a read signal;
    determining repeatable runout of the spiral pattern using the read signal; and
    writing a final servo pattern on the disk using the head and using the spiral pattern and the repeatable runout to position the head.

72. The method of claim 71, including writing a clock track on the disk, then writing the spiral pattern using the clock track, and then writing the preliminary servo pattern without using the spiral pattern.

73. The method of claim 72, including writing the clock track, the spiral pattern and the preliminary servo pattern using an external servo writer, and then writing the final servo pattern without using the servo writer.

74. The method of claim 71, including writing the spiral pattern during multiple revolutions of the disk, writing the preliminary servo pattern during a single revolution of the disk, and writing the final servo pattern during a single revolution of the disk.

75. The method of claim 71, including reading the preliminary servo pattern to determine absolute position information, and then determining the repeatable runout.

76. The method of claim 71, including reading the preliminary servo pattern to position the head, then determining the repeatable runout, and then using the spiral pattern and the repeatable runout to position the head as the first time using the spiral pattern to position the head.

77. The method of claim 71, including writing another final servo pattern on the disk at a predetermined track spacing relative to the final servo pattern using the head and using the spiral pattern and the repeatable runout to position the head.

78. The method of claim 71, including writing another final servo pattern on the disk at a predetermined track spacing relative to the final servo pattern using the head and using the final servo pattern to position the head.

79. The method of claim 71, wherein the spiral pattern is between and proximate to inner and outer diameters of the disk, the preliminary servo pattern is proximate to one of the inner and outer diameters of the disk and to an end of the spiral pattern, and the final servo pattern is at a predetermined track spacing from the preliminary servo pattern.

80. The method of claim 71, wherein the final servo pattern is in a servo spoke that overwrites radially offset portions of the spiral pattern.

81. A method of self-servo writing in a disk drive, wherein the disk drive includes a head and a disk, the method comprising the following steps in the sequence set forth:
  writing a spiral pattern and a preliminary servo pattern on the disk using the head, wherein the spiral pattern is an essentially continuous high frequency pattern that extends across multiple servo tracks on the disk, the preliminary servo pattern is in a single servo track on the disk and writing the spiral pattern includes using an external servo writer;
  reading the preliminary servo pattern from the disk using the head to generate a read signal;
  determining repeatable runout of the spiral pattern using the read signal; and
  writing a final servo pattern on the disk at a predetermined track spacing relative to the preliminary servo pattern using the head and using the spiral pattern and the repeatable runout to position the head without using the servo writer.

82. The method of claim 81, including writing the spiral pattern during multiple revolutions of the disk, writing the preliminary servo pattern during a single revolution of the disk, and writing the final servo pattern during a single revolution of the disk.

83. The method of claim 81, including writing the preliminary servo pattern using the servo writer.

84. The method of claim 81, including writing the preliminary servo pattern without using the servo writer.

85. The method of claim 81, including reading the preliminary servo pattern to determine absolute position information, and then determining the repeatable runout.

86. The method of claim 81, including reading the preliminary servo pattern to position the head, then determining the repeatable runout, and then using the spiral pattern and the repeatable runout to position the head as the first time using the spiral pattern to position the head.

87. The method of claim 81, including writing another final servo pattern on the disk at a predetermined track spacing relative to the final servo pattern using the head and using the spiral pattern and the repeatable runout to position the head.

88. The method of claim 81, including writing another final servo pattern on the disk at a predetermined track spacing relative to the final servo pattern using the head and using the final servo pattern to position the head.

89. The method of claim 81, wherein the spiral pattern is between and proximate to inner and outer diameters of the disk, and the preliminary servo pattern is proximate to one of the inner and outer diameters of the disk and to a starting point of the spiral pattern.

90. The method of claim 81, wherein the final servo pattern is in a servo spoke that overwrites radially offset portions of the spiral pattern.

91. A method of self-servo writing in a disk drive, wherein the disk drive includes a head, a disk and drive electronics, the method comprising the following steps in the sequence set forth:
  writing a clock track on the disk using an external servo writer;
  writing a spiral pattern on the disk using the head, the clock track and the servo writer, wherein the spiral pattern is an essentially continuous high frequency pattern that extends across multiple servo tracks on the disk;
  writing a preliminary servo pattern on the disk using the head and the servo writer without using the spiral pattern, wherein the preliminary servo pattern is in a single servo track on the disk;
  removing the head and the disk from the servo writer and connecting the head and the disk to the drive electronics;
  reading the preliminary servo pattern from the disk using the head to generate a read signal;
  determining repeatable runout of the spiral pattern using the read signal; and
  writing a final servo pattern on the disk at a predetermined track spacing relative to the preliminary servo pattern using the head and using the spiral pattern, the repeatable runout and the drive electronics to position the head without using the servo writer.

92. The method of claim 91, including writing the clock track using an external clock head.

93. The method of claim 91, including reading the preliminary servo pattern, determining the repeatable runout and writing the final servo pattern while the disk drive is at a self-scan station.

94. The method of claim 91, including writing the spiral pattern during multiple revolutions of the disk, writing the preliminary servo pattern during a single revolution of the disk, and writing the final servo pattern during a single revolution of the disk.

95. The method of claim 91, including reading the preliminary servo pattern to determine absolute position information, and then determining the repeatable runout.

96. The method of claim 91, including reading the preliminary servo pattern to position the head, then determining the repeatable runout, and then using the spiral pattern and the repeatable runout to position the head as the first time using the spiral pattern to position the head.

97. The method of claim 91, including writing another final servo pattern on the disk at a predetermined track spacing relative to the final servo pattern using the head and using the spiral pattern and the repeatable runout to position the head.

98. The method of claim 91, including writing another final servo pattern on the disk at a predetermined track spacing relative to the final servo pattern using the head and using the final servo pattern to position the head.

99. The method of claim 91, wherein the spiral pattern is between and proximate to inner and outer diameters of the disk, and the preliminary servo pattern is proximate to one of the inner and outer diameters of the disk and to a starting point of the spiral pattern.

100. The method of claim 91, wherein the final servo pattern is in a servo spoke that overwrites radially offset portions of the spiral pattern.

* * * * *